United States Patent
Degura et al.

(10) Patent No.: US 12,381,037 B2
(45) Date of Patent: Aug. 5, 2025

(54) MULTILAYER CERAMIC CAPACITOR

(71) Applicant: Murata Manufacturing Co., Ltd., Nagaokakyo (JP)

(72) Inventors: Takashi Degura, Nagaokakyo (JP); Naobumi Ikegami, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 50 days.

(21) Appl. No.: 17/947,218

(22) Filed: Sep. 19, 2022

(65) Prior Publication Data

US 2023/0101380 A1 Mar. 30, 2023

(30) Foreign Application Priority Data

Sep. 27, 2021 (JP) .................. 2021-156685

(51) Int. Cl.
| | | |
|---|---|---|
| *H01G 4/012* | (2006.01) | |
| *H01G 4/12* | (2006.01) | |
| *H01G 4/232* | (2006.01) | |
| *H01G 4/30* | (2006.01) | |

(52) U.S. Cl.
CPC ........... *H01G 4/012* (2013.01); *H01G 4/2325* (2013.01); *H01G 4/30* (2013.01); *H01G 4/1236* (2013.01)

(58) Field of Classification Search
CPC ........ H01G 4/232; H01G 4/12; H01G 2/1236; H01G 2/24; H01G 4/0085; H01G 4/012; H01G 4/20; H01G 4/2325; H01G 4/30; H01G 4/306; H01G 4/33; H01G 4/1227; H01G 4/248; H01G 4/02
See application file for complete search history.

(56) References Cited

U.S. PATENT DOCUMENTS

| | | | | |
|---|---|---|---|---|
| 2009/0154055 A1* | 6/2009 | Takashima | ............... | H01G 4/30 |
| | | | | 361/301.4 |
| 2012/0113560 A1* | 5/2012 | Takashima | ............. | H01G 4/228 |
| | | | | 361/301.4 |
| 2015/0041199 A1* | 2/2015 | Lee | ........................ | H01G 4/005 |
| | | | | 361/306.3 |

(Continued)

FOREIGN PATENT DOCUMENTS

| | | |
|---|---|---|
| CN | 104779052 A | 7/2015 |
| CN | 105702453 A | 6/2016 |

(Continued)

OTHER PUBLICATIONS

Office Action in JP2021-156685, mailed Jan. 9, 2024, 3 pages.

(Continued)

*Primary Examiner* — Michael P McFadden
(74) *Attorney, Agent, or Firm* — Keating & Bennett, LLP

(57) ABSTRACT

A multilayer ceramic capacitor includes a multilayer body including dielectric ceramic layers laminated in the lamination direction, first and second main surfaces opposed in the lamination direction, first and second lateral surfaces opposed in a width direction, first and second end surfaces opposed in a length direction, a pair of external electrodes. The dielectric ceramic layers each include at least one selected from Ca, Zr, and Ti. The pair of external electrodes include first and second external electrodes respectively on the first and second lateral surfaces. A length direction is longer than the lamination direction or the width direction.

15 Claims, 8 Drawing Sheets

(56) References Cited

U.S. PATENT DOCUMENTS

| | | | |
|---|---|---|---|
| 2015/0116901 A1 | 4/2015 | Sasaoka | |
| 2015/0200054 A1* | 7/2015 | Lee | H01G 4/12 |
| | | | 29/25.42 |
| 2016/0163455 A1* | 6/2016 | Iwama | H01G 4/012 |
| | | | 361/301.4 |
| 2016/0284471 A1* | 9/2016 | Mizuno | H01G 4/1227 |
| 2017/0221634 A1* | 8/2017 | Inomata | H01G 4/385 |
| 2017/0345572 A1* | 11/2017 | Sasaki | H01G 4/232 |
| 2018/0012706 A1* | 1/2018 | Bultitude | H01G 4/33 |
| 2019/0096583 A1* | 3/2019 | Sasaki | H01G 4/232 |
| 2019/0272954 A1 | 9/2019 | Ariga et al. | |
| 2020/0027661 A1* | 1/2020 | Park | H01G 4/12 |
| 2020/0066447 A1* | 2/2020 | Murai | H01G 4/30 |
| 2021/0020379 A1 | 1/2021 | Ono et al. | |
| 2021/0118615 A1* | 4/2021 | Shimura | H01G 4/1227 |

FOREIGN PATENT DOCUMENTS

| | | |
|---|---|---|
| JP | S6020136 U | 2/1985 |
| JP | S6020139 U | 2/1985 |
| JP | 2000012377 A | 1/2000 |
| JP | 2009170873 A | 7/2009 |
| JP | 2015111655 A | 6/2015 |
| JP | 2016111247 A | 6/2016 |
| JP | 2019-153778 A | 9/2019 |
| JP | 2021019186 A | 2/2021 |
| KR | 20200009978 A | 1/2020 |

OTHER PUBLICATIONS

Official Communication issued in corresponding Chinese Patent Application No. 202211043811.0, mailed on Jun. 13, 2025, 7 pages.

* cited by examiner

MULTILAYER CERAMIC CAPACITOR

CROSS REFERENCE TO RELATED APPLICATIONS

This application claims the benefit of priority to Japanese Patent Application No. 2021-156685 filed on Sep. 27, 2021. The entire contents of this application are hereby incorporated herein by reference.

BACKGROUND OF THE INVENTION

1. Field of the Invention

The present invention relates to a multilayer ceramic capacitor.

2. Description of the Related Art

Conventionally, multilayer ceramic capacitors including dielectric ceramic layer containing $CaZrO_3$ (calcium zirconate) as a main component and internal electrodes containing a base metal such as Cu have been known (see, for example, Japanese Unexamined Patent Application Publication No. 2019-153778).

In recent years, with an increase in signal transmission speed, there has been a demand for high frequency handling such as several hundred MHz to several GHz in a multilayer ceramic capacitor mounted on an AC circuit. However, the conventional multilayer ceramic capacitors have a characteristic in that ESL (equivalent series inductance) increases when signal transmission is performed in a high frequency region.

SUMMARY OF THE INVENTION

Preferred embodiments of the present invention provide multilayer ceramic capacitors in each of which an increase in ESL is reduced or prevented even in a high-frequency region, such that an increase in frequency is able to be handled.

A preferred embodiment of the present invention provides a multilayer ceramic capacitor that includes a multilayer body having a rectangular or substantially rectangular parallelepiped shape, the multilayer body including a plurality of dielectric ceramic layers laminated in a lamination direction T, the multilayer body further including a first main surface and a second main surface defining a pair of main surfaces opposed in the lamination direction T, a first lateral surface and a second lateral surface defining a pair of lateral surfaces opposed in a width direction W orthogonal or substantially orthogonal to the lamination direction T, and a first end surface and a second end surface defining a pair of end surfaces opposed in a length direction L orthogonal or substantially orthogonal to the lamination direction T and the width direction W, and a pair of external electrodes, wherein the dielectric ceramic layers each include at least one selected from Ca, Zr, and Ti, the pair of external electrodes include a first external electrode on the first lateral surface and a second external electrode on the second lateral surface, and the length direction L is longer than the lamination direction T or the width direction W.

According to preferred embodiments of the present invention, it is possible to provide multilayer ceramic capacitors in each of which an increase in ESL is reduced or prevented even in a high frequency region, and it is possible to deal with an increase in frequency.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

First Preferred Embodiment

Figure 1:
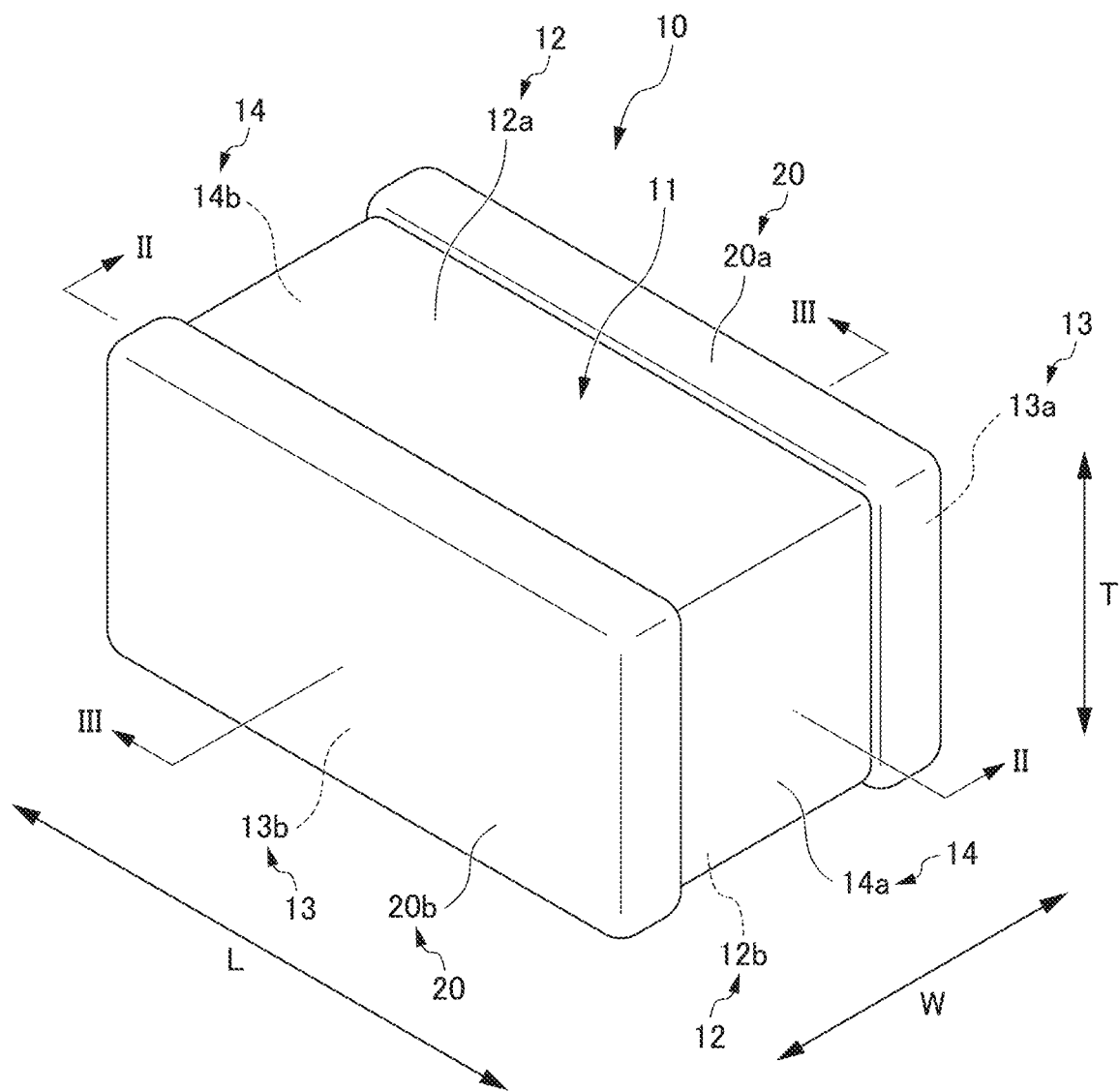
FIG. 1 is an external perspective view of a multilayer ceramic capacitor according to a first preferred embodiment of the present invention.
Figure 2:
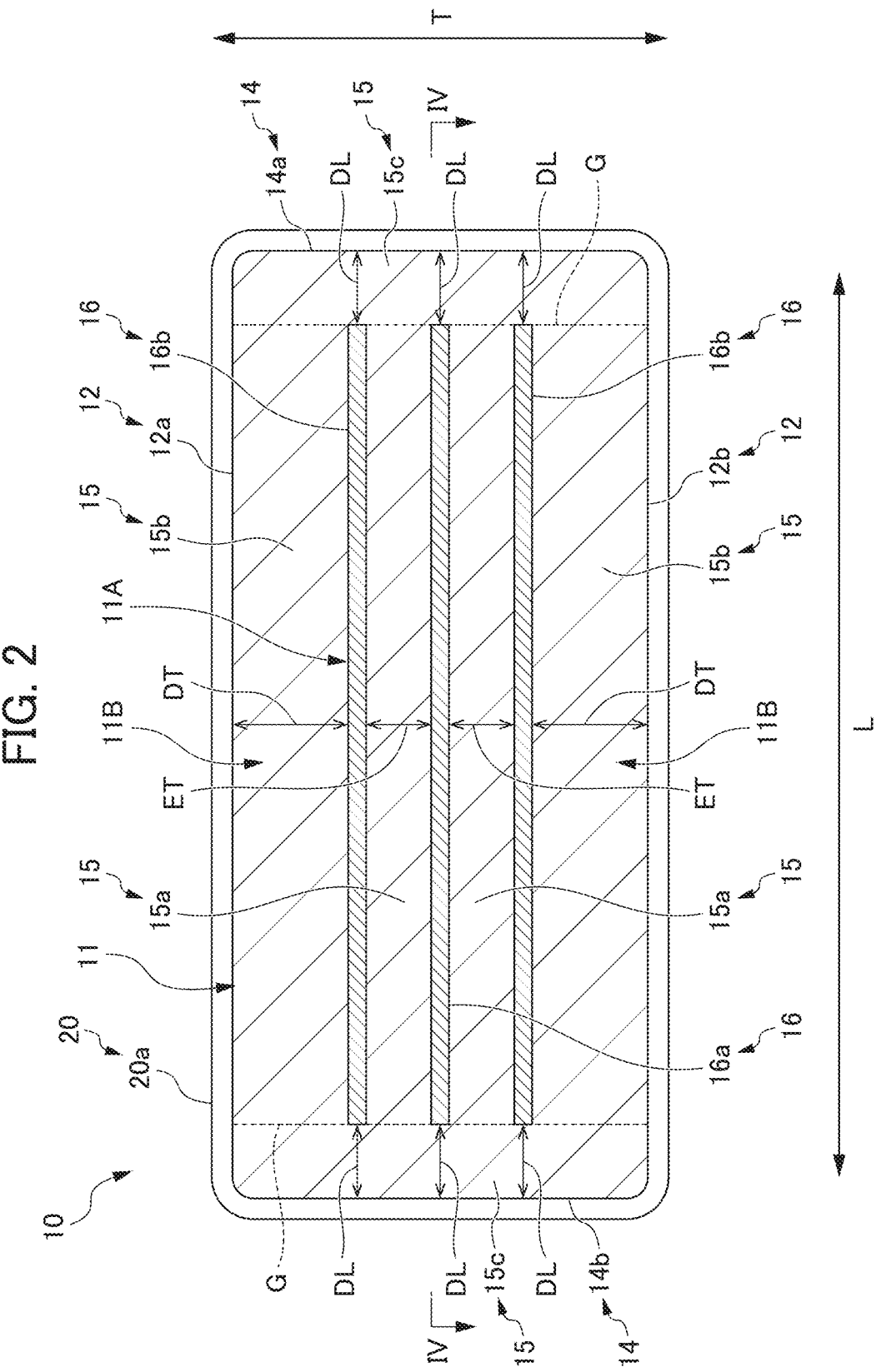
FIG. 2 is a cross-sectional view (cross section LT) taken along the line II-II of FIG. 1.
Figure 3:
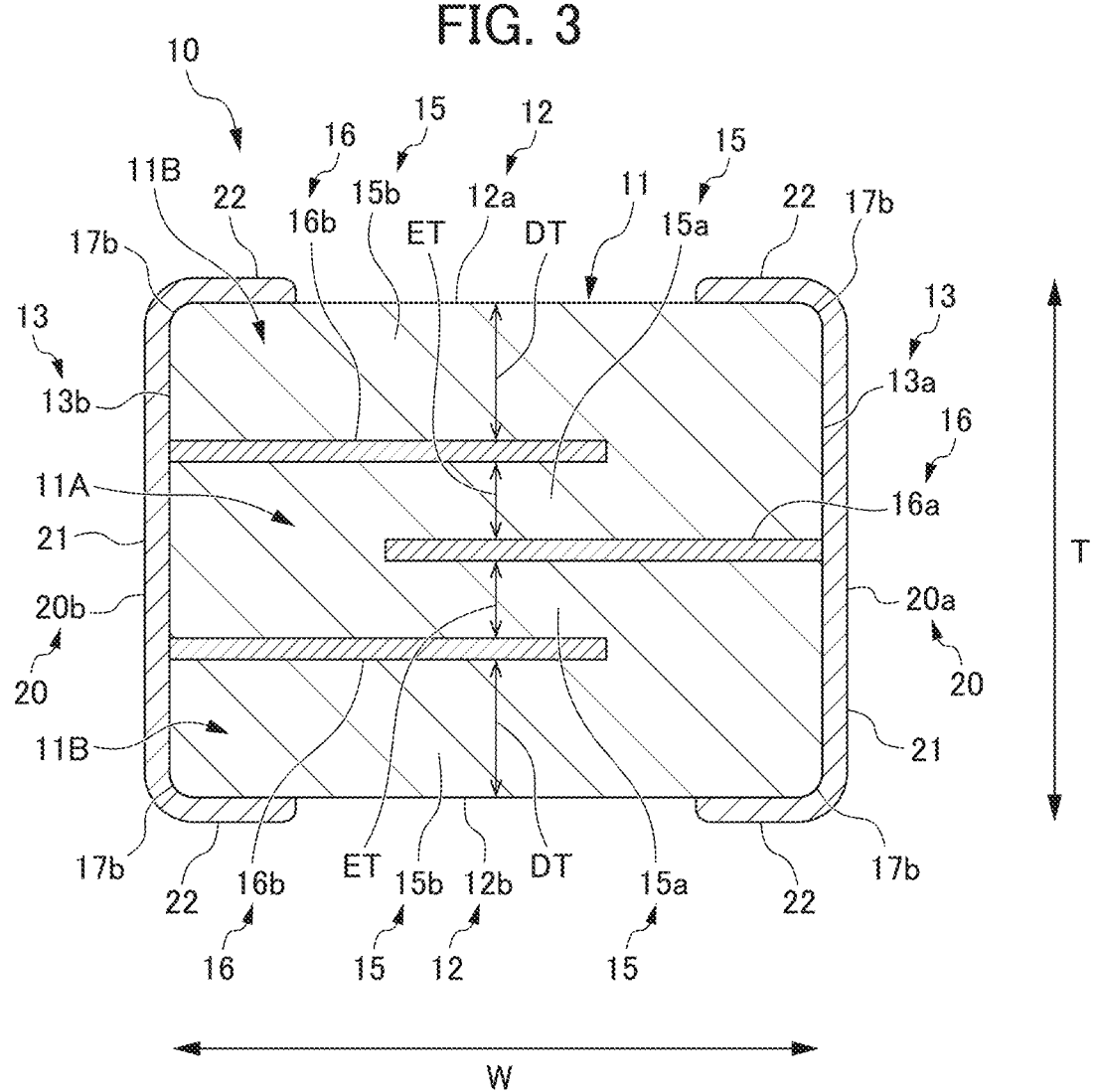
FIG. 3 is a cross-sectional view (cross section WT) taken along the line III-III of FIG. 1.
Figure 4:
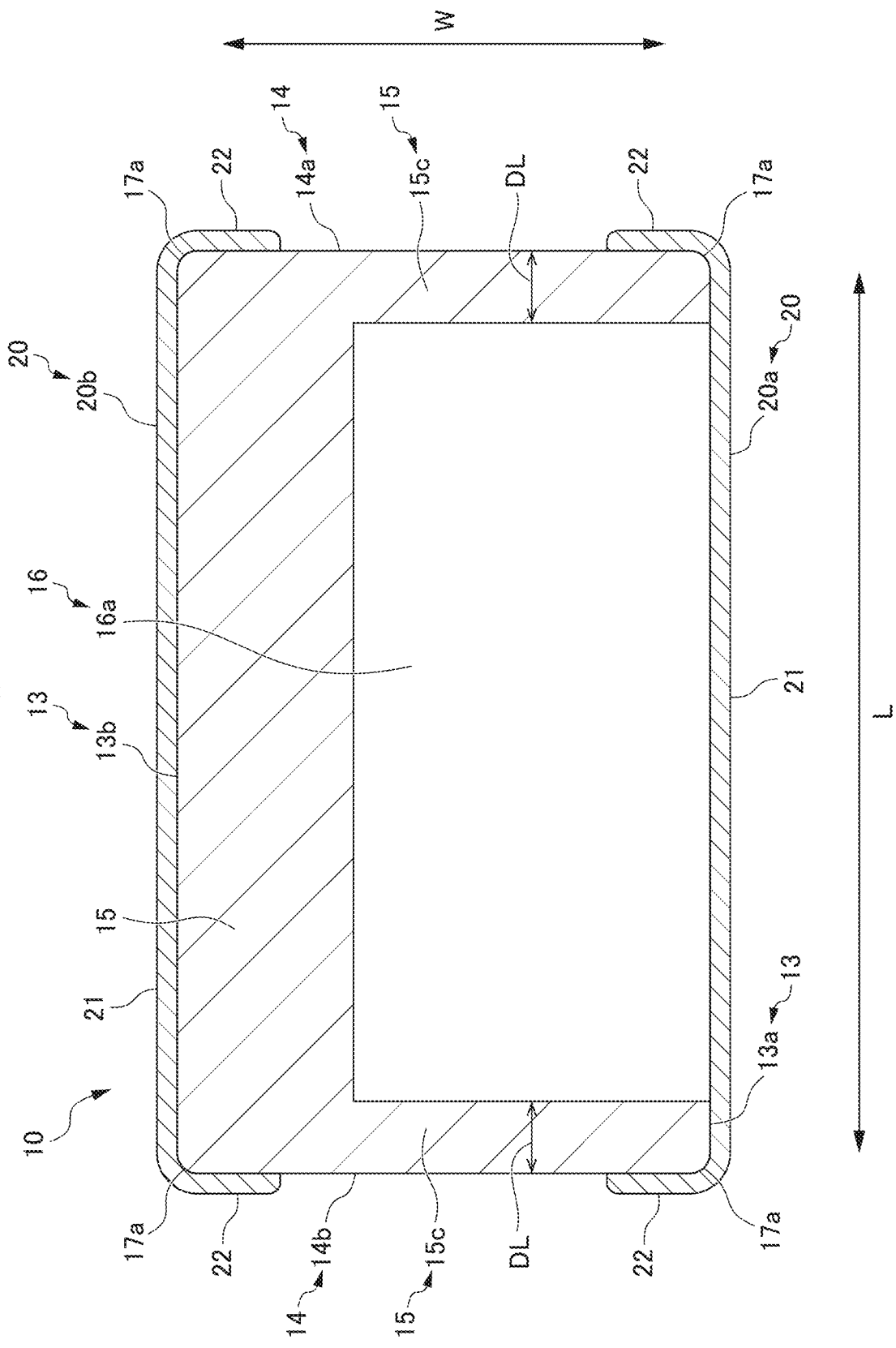
FIG. 4 is a cross-sectional view (cross section LW) taken along the line IV-IV of FIG. 2.

FIG. 1 is a schematic perspective view of a multilayer ceramic capacitor 10 according to a first preferred embodiment of the present invention. FIG. 2 is a cross-sectional view taken along the line II-II shown in FIG. 1. FIG. 3 is a cross-sectional view taken along the line III-III shown in FIG. 1. FIG. 4 is a cross-sectional view taken along the line IV-IV shown in FIG. 2.

As shown in FIG. 1, the multilayer ceramic capacitor 10 of the first preferred embodiment has a rectangular or substantially rectangular parallelepiped shape. The multilayer ceramic capacitor 10 includes a multilayer body 11 having a rectangular or substantially rectangular parallelepiped shape and a pair of external electrodes 20.

In FIGS. 1 to 3, the arrow T indicates a lamination (stacking) direction of the multilayer ceramic capacitor 10 and the multilayer body 11. In FIGS. 1, 2, and 4, the arrow L indicates a length direction orthogonal or substantially orthogonal to the lamination direction T of the multilayer ceramic capacitor 10 and the multilayer body 11. In FIGS. 1, 3, and 4, the arrow W indicates a width direction of the multilayer ceramic capacitor 10 and the multilayer body 11 orthogonal or substantially orthogonal to the lamination direction T and the length direction L. In the multilayer ceramic capacitor 10 of the first preferred embodiment, the length direction L is the longest, and the width direction W is longer than the lamination direction T. FIG. 2 shows a cross section LT, FIG. 3 shows a cross section WT, and FIG. 4 shows a cross section LW.

The multilayer body 11 includes a first main surface 12a and a second main surface 12b as a pair of main surfaces 12 opposed to each other in the lamination direction T, a first lateral surface 13a and a second lateral surface 13b as a pair of lateral surfaces 13 opposed to each other in the width direction W orthogonal or substantially orthogonal to the lamination direction T, and a first end surface 14a and a second end surface 14b as a pair of end surfaces 14 opposed to each other in the length direction L orthogonal or substantially orthogonal to the lamination direction T and the width direction W.

As shown in FIGS. 1 and 3, the pair of external electrodes 20 are spaced apart from each other so as to cover the outer surfaces of both end portions of the multilayer body 11 in the width direction W. Each of the pair of external electrodes 20 is made of an electrically conductive film. The pair of external electrodes 20 include a first external electrode 20a on the first lateral surface 13a and a second external electrode 20b on the second lateral surface 13b.

As shown in FIGS. 3 and 4, the external electrode 20 includes portions 21 that each cover the lateral surface 13, and portions 22 that each extend from the portion 21 that covers the lateral surface 13 to the main surface 12 and the end surface 14 and covers the main surface 12 and the end surface 14. Hereinafter, the portion 21 covering the lateral surface 13 may be referred to as a lateral surface covering portion 21, and the portion 22 covering the main surface 12 and the end surface 14 may be referred to as an end surface covering portion 22.

Each of the first external electrode 20a and the second external electrode 20b is made of, for example, a laminated film including a sintered metal layer and a plating layer. The sintered metal layer is formed by firing a paste such as Cu, Ni, Ag, Pd, Ag—Pd alloy, or Au, for example. The plating layer includes, for example, a Ni-plated layer and a Sn-plated layer covering the Ni-plated layer. The plating layer may be, for example, a Cu-plated layer or an Au-plated layer instead. Furthermore, each of the first external electrode 20a and the second external electrode 20b may include only plating layers, and a conductive resin paste may be used.

As shown in FIGS. 2 to 4, the multilayer body 11 includes a plurality of dielectric ceramic layers 15 and a plurality of internal electrode layers 16 laminated in the lamination direction T.

As shown in FIGS. 2 and 3, the dielectric ceramic layer 15 includes a plurality of first dielectric ceramic layers 15a sandwiched between the internal electrode layers 16, a pair of second dielectric ceramic layers 15b provided at both ends in the lamination direction T and each having a thickness larger than that of the first dielectric ceramic layers 15a, and a pair of third dielectric ceramic layers 15c provided at both ends in the length direction L and sandwiching the internal electrode layers 16 in the length direction L. In FIG. 2, a broken line G indicates a virtual boundary between the third dielectric ceramic layer 15c and the first dielectric ceramic layer 15a or the second dielectric ceramic layer 15b.

The dielectric ceramic layer 15 of the first preferred embodiment includes, as a main component, a ceramic material including, for example, at least one selected from Ca, Zr, and Ti. More specifically, for example, a ceramic material having a perovskite structure represented by the general formula $ABO_3$ including Ca and Zr is used as a main component. Examples of the ceramic material having such a perovskite structure include, but are not limited to, $CaZrO_3$ (calcium zirconate) and $TiO_2$ (titanium oxide). The main component of the ceramic material forming the dielectric ceramic layer 15 may include, for example, all of Ca, Zr, and Ti. Alternatively, for example, Ca $(Zr0.9Ti0.1)O_3$ obtained by replacing a portion of $ZrO_3$ or Zr with Ti in $CaZrO_3$ or the like may be used.

As a ceramic material forming the dielectric ceramic layer 15, $(Ca_{1-x-y}, Sr_x, Ba_y)_m(Zr_{1-z-\alpha}, Ti_z, Hf_\alpha)O_3$ (where x is 0 or more and 1 or less, y is 0 or more and 0.4 or less, m is 1.0 or more and 1.1 or less, z is 0 or more and 0.2 or less, and a is 0 or more and 0.3 or less.) or the like may be used.

Additives are added to the ceramic material forming the dielectric ceramic layer 15 depending on the purpose. Examples of such additives include oxides of Mn, Mg, Dy, Cr, oxides of rare earth elements such as V, Sm, Eu, Gd, Tb, Ho, Er, Tm, Yb, and Y, oxides of Co, Ni, Li, B, Na, K, and Si, and glass.

The internal electrode layer 16 is a conductive thin film including metals such as, for example, Ni, Cu, Ag, Pd, Ag—Pd alloy, and Au. In order to obtain good frequency characteristics of the multilayer ceramic capacitor 10, Cu is preferably used for the internal electrode layer 16. The internal electrode layer 16 may further include dielectric particles having the same composition as the ceramic contained in the dielectric ceramic layer 15.

As shown in FIGS. 2 and 3, the multilayer body 11 of the first preferred embodiment includes three internal electrode layers 16 provided at equal or substantially equal intervals in the lamination direction T. The multilayer body 11 includes an inner layer portion 11A in which three internal electrode layers 16 are each opposed with the first dielectric ceramic layer 15a interposed therebetween, and a pair of outer layer portions 11B sandwiching the inner layer portion 11A in the lamination direction T. In the inner layer portion 11A, the three internal electrode layers 16 are alternately laminated with the first dielectric ceramic layers 15a interposed therebetween.

As shown in FIG. 3, the three internal electrode layers 16 include one first internal electrode layer 16a and two second internal electrode layers 16b. One first internal electrode layer 16a is provided at the center in the lamination direction T. The first internal electrode layer 16a extends toward the first lateral surface 13a of the lateral surface 13 of the multilayer body 11, and is electrically connected to the first external electrode 20a. Each of the two second internal electrode layers 16b is provided on both sides of the first internal electrode layer 16a in the lamination direction T. Each of the second internal electrode layers 16b extends toward the second lateral surface 13b and is electrically connected to the second external electrode 20b. That is, in the inner layer portion 11A, one first internal electrode layer 16a connected to the first external electrode 20a and two second internal electrode layers 16b connected to the second external electrode 20b are alternately laminated in the lamination direction T with the first dielectric ceramic layers 15a interposed therebetween. Thus, two capacitor elements are electrically connected in parallel between the first external electrode 20a and the second external electrode 20b.

As shown in FIG. 4, the multilayer body 11 includes four first ridge portions 17a extending in the lamination direction T (front-back direction in paper plane of FIG. 4) between the end surface 14 and the lateral surface 13. As shown in FIG. 3, the multilayer body 11 includes four second ridge portions 17b extending in the length direction L (front-back direction in paper plane of FIG. 3) between the main surface 12 and the lateral surface 13. As shown in FIG. 2, the multilayer body 11 includes four third ridge portions 17c extending in the width direction W (front-back direction in paper plane of FIG. 2) between the main surface 12 and the end surface 14.

In the multilayer ceramic capacitor 10 of the first preferred embodiment, for example, the multilayer body 11 is formed by laminating a ceramic material such as a ceramic green sheet functioning as the dielectric ceramic layer 15 and a conductive material such as a conductive paste defining and functioning as the internal electrode layer 16. Then, the multilayer body 11 is fired, after which the external electrodes 20 are formed by firing, plating, or the like, for example, thus manufacturing the multilayer ceramic capacitor 10. The external electrode 20 may be formed by firing a portion or all of the external electrode 20 at the same time as firing the multilayer body 11, except for plating.

As shown in FIGS. 2 and 3, the thickness ET in the lamination direction T of each of the two dielectric ceramic layers 15 of the inner layer portion 11A, i.e., the two first dielectric ceramic layers 15a sandwiched between the internal electrode layers 16 in the lamination direction T, is preferably, for example, about 2 μm or more and about 40 μm or less.

The thicknesses of the first internal electrode layer 16a and the second internal electrode layers 16b are each preferably, for example, about 0.5 μm or more and about 2.5 μm or less.

As shown in FIGS. 2 and 3, the distance DT in the lamination direction T between the main surface 12 and the internal electrode layer 16 closest to the main surface 12 in the lamination direction T, that is, between the first main surface 12a and the second internal electrode layer 16b on the first main surface 12a side, and between the second main surface 12b and the second internal electrode layer 16b on the second main surface 12b side, is preferably, for example, about 10 μm or more and about 300 μm or less.

As shown in FIGS. 2 and 4, the distance DL in the length direction L between the end surface 14 and the internal electrode layer 16, that is, between the first end surface 14a and the first internal electrode layer 16a and the second internal electrode layer 16b, and between the second end surface 14b and the first internal electrode layer 16a and the second internal electrode layer 16b, is preferably, for example, about 5 μm or more and about 100 μm or less, and more preferably about 5 μm or more and about 40 μm or less.

The radius of curvature of each of the first ridge portions 17a shown in FIG. 4 is preferably, for example, about 10 μm to about 25 μm. The radius of curvature of each of the second ridge portions 17b shown in FIG. 3 is preferably, for example, about 10 μm to about 25 μm. The radius of curvature of each of the third ridge portions 17c shown in FIG. 2 is preferably, for example, about 10 μm to about 25 μm.

Figure 5:
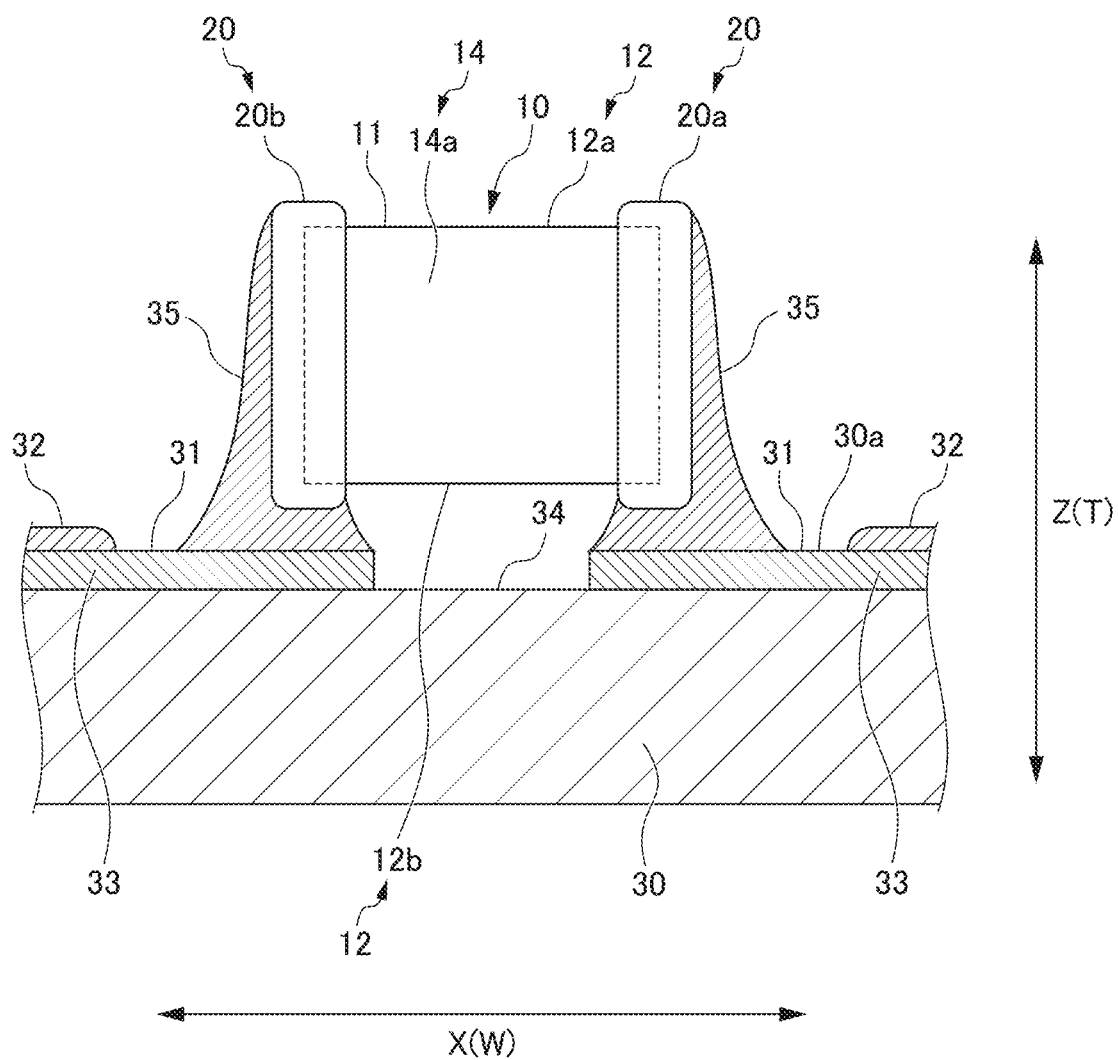
FIG. 5 is a partial cross-sectional view showing an example of a structure in which the multilayer ceramic capacitor of the first preferred embodiment of the present invention is mounted on a board.

FIG. 5 shows an example of a state in which the multilayer ceramic capacitor 10 of the first preferred embodiment is mounted on a board 30. In the multilayer ceramic capacitor 10, each of the pair of external electrodes 20 is soldered to a pair of lands 31 provided on the board 30 so as to be spaced apart from each other in the X direction. The front surface 30a of the board 30 is covered with an insulating film 32 made of solder resist while leaving a predetermined mounting region. Wiring 33 is provided on the front surface 30a of the board 30. The wiring 33 is discontinuous with a separation portion 34 interposed therebetween, and the pair of lands 31, which are portions where the wiring 33 is not covered with the insulating film 32, are exposed on both sides of the separation portion 34. The pair of lands 31 are provided on the front surface 30a of the board 30 so as to be spaced apart from each other in the X direction.

In the multilayer ceramic capacitor 10, the width direction W is parallel or substantially parallel to the X direction, and the lamination direction T is following or substantially following the vertical direction Z orthogonal or substantially orthogonal to the surface 30a of the board 30. With such a configuration, the second main surface 12b of the main surface 12 of the multilayer body 11 is opposed to the surface 30a of the board 30 in parallel or almost in parallel. In the multilayer ceramic capacitor 10, one external electrode 20 (the first external electrode 20a) is connected to one land 31 via solder 35, and the other external electrode 20 (the second external electrode 20b) is connected to the other land 31 via solder 35.

The multilayer ceramic capacitor 10 according to the present preferred embodiment as described above includes the multilayer body having a rectangular or substantially rectangular parallelepiped shape, the multilayer body 11 including the plurality of dielectric ceramic layers 15 laminated in the lamination direction T, the multilayer body 11 further including the first main surface 12a and the second main surface 12b defining a pair of main surfaces 12 which are opposed in the lamination direction T, the first lateral surface 13a and the second lateral surface 13b defining a pair of lateral surfaces 13 opposed in the width direction W orthogonal or substantially orthogonal to the lamination direction T, and the first end surface 14a and the second end surface 14b defining a pair of end surfaces 14 which are opposed in the length direction L orthogonal or substantially orthogonal to the lamination direction T and the width direction W, and the pair of external electrodes 20, wherein the dielectric ceramic layers 15 each include at least one selected from Ca, Zr, and Ti, the pair of external electrodes 20 include the first external electrode 20a on the first lateral surface 13a and the second external electrode 20b on the second lateral surface 13b, and the length direction L is longer than the lamination direction T or the width direction W.

With such a configuration, since the length direction L is longer than the width direction W, the length in the width direction of the internal electrode layer is shortened, and the distance between the pair of external electrodes on both sides of the internal electrode layer is shortened. As a result, since the path of the current flowing through the internal electrode layer 16 is shortened, it is possible to achieve a low capacitance and the reduction of ESL, such that it is possible to handle a high-frequency signal.

In the multilayer ceramic capacitor 10 according to the first preferred embodiment, it is preferable that the multilayer body 11 includes the plurality of internal electrode layers 16, and the plurality of internal electrode layers 16 include the first internal electrode layer 16a that extends toward the first lateral surface 13a and is connected to the first external electrode 20a, and the second internal electrode layer 16b that extends toward the second lateral surface 13b and is connected to the second external electrode 20b.

With such a configuration, the internal electrode layers 16 connected to each of the first lateral surface 13a and the second lateral surface 13b of the multilayer body 11 can be accurately arranged, such that it is possible to provide a multilayer ceramic capacitor which can handle an increase in frequency.

In the multilayer ceramic capacitor 10 according to the first preferred embodiment, it is preferable that the thickness of each of the dielectric ceramic layers 15 is, for example, about 2 μm or more and about 40 μm or less.

Since the thickness of the dielectric ceramic layer 15 is as large as about 2 μm or more and about 40 μm or less, it is possible to achieve the reduction in capacitance of the multilayer ceramic capacitor 10 according to the first preferred embodiment. Therefore, in the multilayer ceramic capacitor 10 according to the first preferred embodiment, it is possible to reduce or prevent an increase in ESL even in the high-frequency region, such that the multilayer ceramic capacitor 10 can further handle high-frequency circuits required for low-capacitance capacitors.

In the multilayer ceramic capacitor 10 according to the first preferred embodiment, it is preferable that the thickness of each of the internal electrode layers 16 is, for example, about 0.5 µm or more and about 2.5 µm or less.

Since the thickness of the internal electrode layer 16 is as large as about 0.5 µm or more and about 2.5 µm or less, it is possible to reduce ESR.

In the multilayer ceramic capacitor 10 according to the first preferred embodiment, it is preferable that the distance DT in the lamination direction T between the main surface 12 of the multilayer body 11 and the internal electrode layer 16 closest to the main surface 12 in the lamination direction T is, for example, about 10 µm or more and about 300 µm or less.

With such a configuration, since the thickness of the dielectric ceramic layers on the outer side in the lamination direction of the internal electrode layers are relatively large, it is possible to achieve a reduction in capacitance and to reduce or prevent an increase in ESL even in a high frequency region, such that it is possible to handle the increase in frequency.

In the multilayer ceramic capacitor 10 according to the first preferred embodiment, it is preferable that the distance DL in the length direction L between the end surface 14 of the multilayer body 11 and the internal electrode layers 16 is, for example, about 5 µm or more and about 100 µm or less, and more preferably about 5 µm or more and about 40 µm or less.

With such a configuration, it is possible to appropriately adjust the size in the length direction L of the internal electrode layers 16 to reduce ESL and ESR, such that it is possible to handle the increase in frequency. Furthermore, it is possible to protect the end surface 14 by the dielectric ceramic layer 15 and to adjust and maximize the dimension in the length direction L of the internal electrode layers 16, such that it is possible to achieve the reduction in capacitance, and the reduction in or the prevention of ESL, and it is possible to handle high-frequency signals.

In the multilayer ceramic capacitor 10 according to the first preferred embodiment, it is preferable that the multilayer body 11 includes the four first ridge portions 17a extending in the lamination direction T between the end surface 14 and the lateral surface 13, the four second ridge portions 17b extending in the length direction L between the main surface 12 and the lateral surface 13, and the four third ridge portions 17c extending in the width direction W between the main surface 12 and the end surface 14, and the radius of curvature of each of the first ridge portions 17a is, for example, about 10 µm to about 25 µm, and the radius of curvature of each of the second ridge portions 17b is, for example, about 10 µm to about 25 µm, and the radius of curvature of each of the third ridge portions 17c is, for example, about 10 µm to about 25 µm.

As shown in FIG. 5, when the multilayer ceramic capacitor 10 is mounted on the board 30 by soldering, the balance of the tension applied from the solder 35 to the pair of external electrodes 20 may be lost, and the Tombstone phenomenon may occur in which one of the external electrodes 20 is separated from the land 31 and the multilayer ceramic capacitor 10 rises. However, according to the multilayer ceramic capacitor 10 of the first preferred embodiment, it is possible to reduce or prevent the occurrence of the Tombstone phenomenon by having the radius of curvature of each ridge portion as described above. In addition, each ridge portion is appropriately chamfered, and chipping is less likely to occur.

Figure 6:
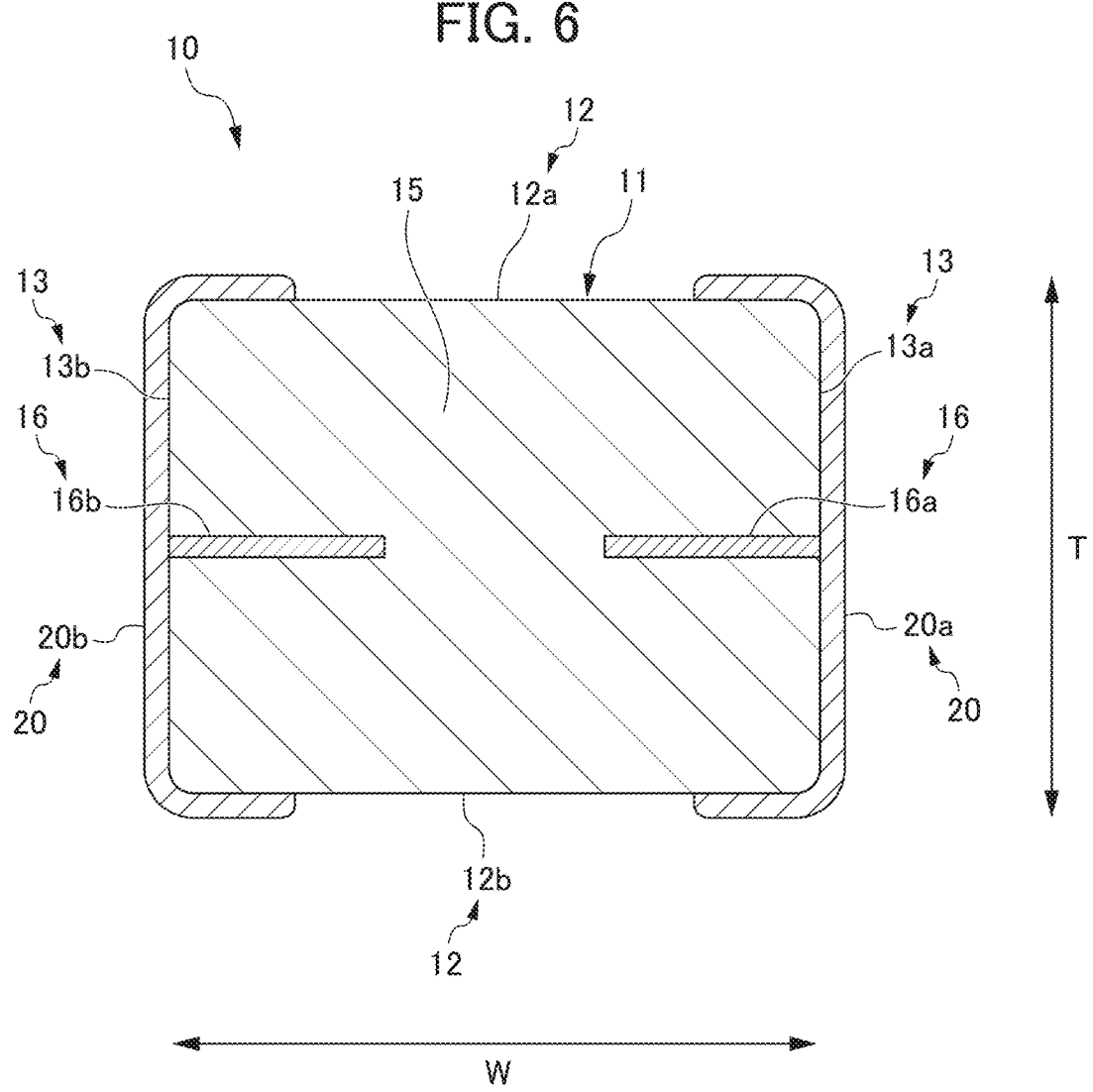
FIG. 6 is a WT cross-sectional view of a multilayer ceramic capacitor according to a second preferred embodiment of the present invention.
Figure 7:
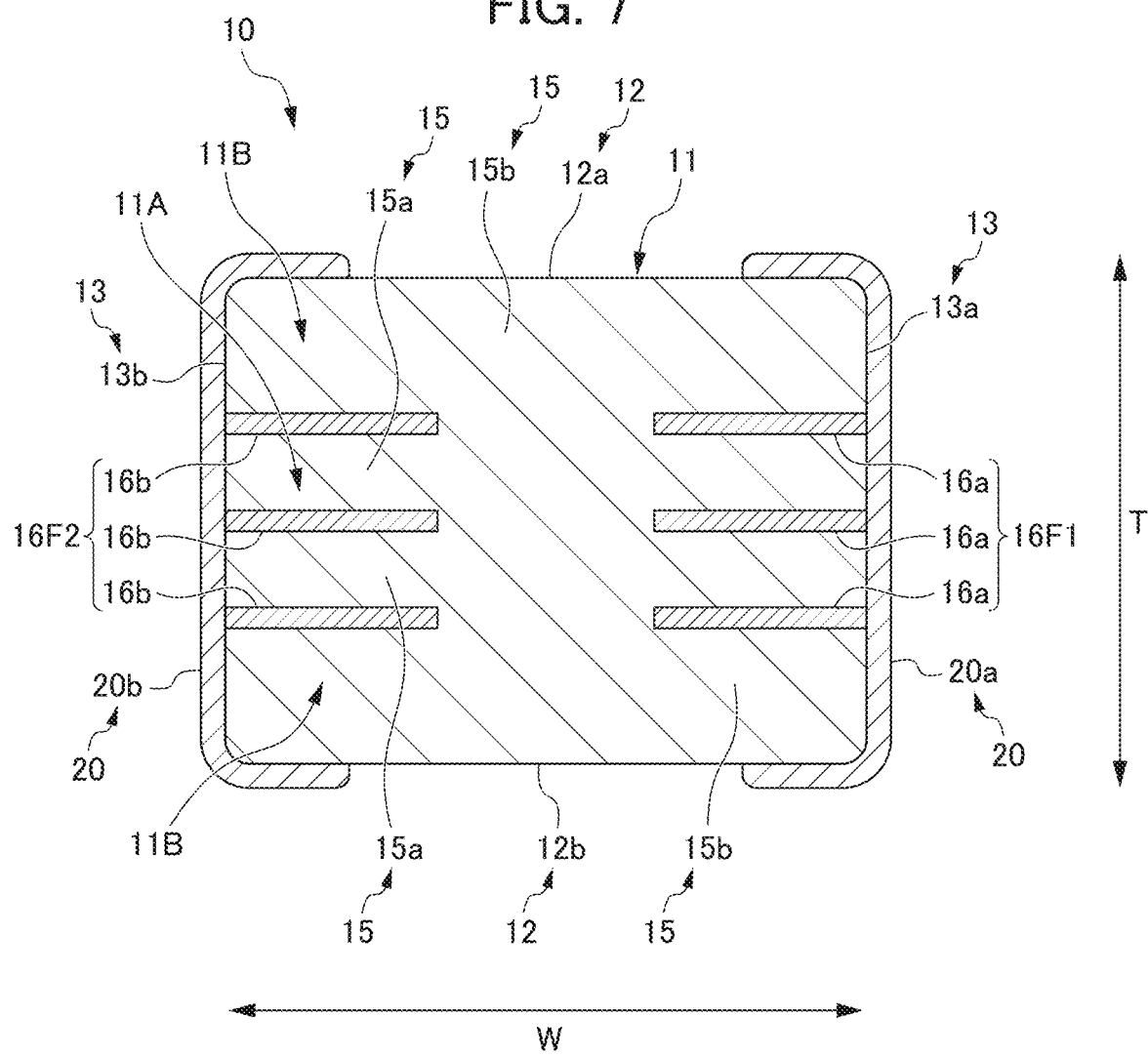
FIG. 7 is a WT cross-sectional view of a multilayer ceramic capacitor according to a third preferred embodiment of the present invention.
Figure 8:
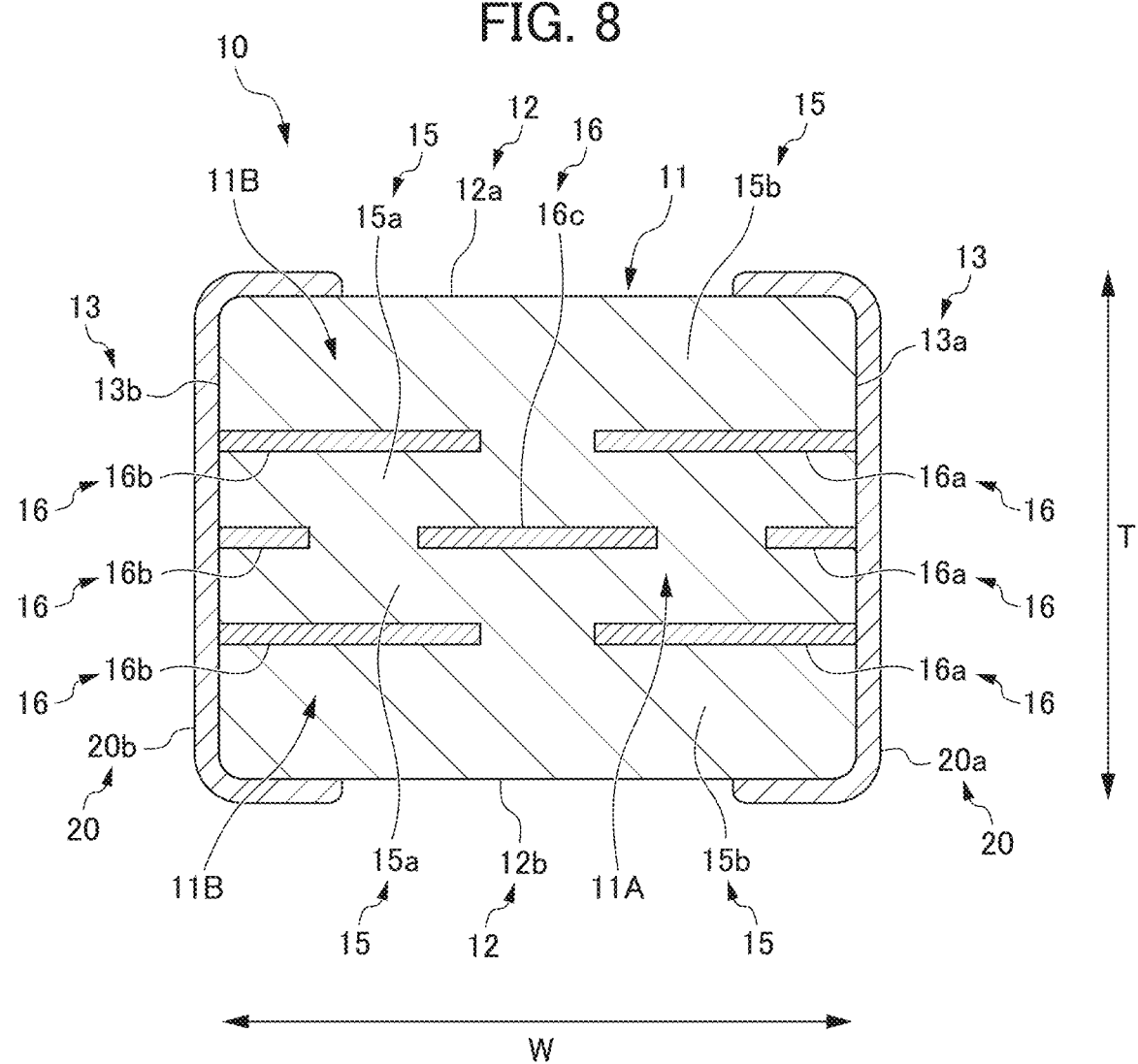
FIG. 8 is a WT cross-sectional view of a multilayer ceramic capacitor according to a fourth preferred embodiment of the present invention.

Next, a second preferred embodiment of the present invention, a third preferred embodiment of the present invention, and a fourth preferred embodiment of the present invention, each including a portion of the first preferred embodiment that is modified will be described with reference to FIGS. 6 to 8. In each of these preferred embodiments, the configuration of the internal electrode layers 16 is different from that in the first preferred embodiment, and the other configurations are the same or substantially the same. Therefore, the same or corresponding components as those in the first preferred embodiment are denoted by the same reference numerals and the description thereof will be omitted, and the differences will be mainly described. In FIGS. 6 to 8, similarly to the first preferred embodiment, the arrow W indicates the width direction, and the arrow T indicates the lamination direction.

Second Preferred Embodiment

FIG. 6 shows a cross section WT of a multilayer ceramic capacitor 10 according to a second preferred embodiment of the present invention. The multilayer ceramic capacitor 10 includes one first internal electrode layer 16a connected to the first external electrode 20a and one second internal electrode layer 16b connected to the second external electrode 20b. The first internal electrode layer 16a and the second internal electrode layer 16b each have a width shorter than half the width of the multilayer body 11, and are provided in parallel or substantially in parallel within the same or substantially the same plane (within the cross section LW) along the length direction L and the width direction W. The length direction L is the front-back direction in the paper plane of FIG. 6. The first internal electrode layer 16a and the second internal electrode layer 16b are provided at or substantially at the center in the lamination direction T, and are spaced apart from each other in the width direction.

In the multilayer ceramic capacitor 10 according to the second preferred embodiment, the first internal electrode layer 16a and the second internal electrode layer 16b are provided in parallel or substantially in parallel within the same or substantially the same plane along the length direction L and the width direction W.

With such a configuration, since the internal electrode layers 16 do not overlap with each other in the lamination direction T, it is possible to achieve a reduction in capacitance of the multilayer ceramic capacitor 10 according to the second preferred embodiment. Therefore, the multilayer ceramic capacitor 10 according to the second preferred embodiment can further handle high-frequency circuits required for low-capacitance capacitors.

Third Preferred Embodiment

FIG. 7 shows a cross section WT of the multilayer ceramic capacitor 10 according to a third preferred embodiment of the present invention. The multilayer ceramic capacitor 10 includes three first internal electrode layers 16a and three second internal electrode layers 16b of the second preferred embodiment. That is, the internal electrode layer 16 of the third preferred embodiment includes a first internal electrode layer group 16F1 in which three first internal electrode layers 16a are laminated in the lamination direction T, and a second internal electrode layer group F2 in which three second internal electrode layers 16b are laminated in the lamination direction T.

The three first internal electrode layers 16a of the first internal electrode layer group 16F1 and the three internal electrode layers 16b of the second internal electrode layer group F2 are respectively provided at equal or substantially equal intervals in the lamination direction T. The pair of first internal electrode layers 16a and the pair of second internal electrode layers 16b adjacent to each other in the width direction W arranged in the upper, middle, and lower layers are provided in parallel or substantially in parallel within the same or substantially the same plane (within the cross section LW) along the length direction L and the width direction W.

The number of the first internal electrode layers 16a included in the first internal electrode layer group 16F1 and the number of the second internal electrode layers 16b included in the second internal electrode layer group F2 are not limited to three as long as they are the same numbers, and may be, for example, on the order of 1 or more and 50 or less.

In the multilayer ceramic capacitor 10 according to the third preferred embodiment, the plurality of internal electrode layers 16 include the first internal electrode layer group 16F1 in which the plurality of first internal electrode layers 16a are laminated in the lamination direction T, and the second internal electrode layer group 16F2 in which the plurality of second internal electrode layers 16b are laminated in the lamination direction T.

With such a configuration, it is possible to ensure a required capacitance by the laminated internal electrode layers 16 and it is possible to reduce ESR.

Fourth Preferred Embodiment

FIG. 8 shows a cross section WT of a multilayer ceramic capacitor 10 according to a fourth preferred embodiment of the present invention. Similar to the third preferred embodiment, the multilayer ceramic capacitor 10 includes three first internal electrode layers 16a and three second internal electrode layers 16b in the lamination direction T. However, the middle first internal electrode layers 16a and the middle second internal electrode layers 16b each have a shorter length in the width direction than those in the upper layer and the lower layer. One third internal electrode layer 16c is provided between the first internal electrode layer 16a and the second internal electrode layer 16b in the middle layer each having a short width. That is, in the middle layer, the first internal electrode layer 16a, the second internal electrode layer 16b, and the third internal electrode layer 16c are provided in parallel or substantially in parallel within the same or substantially the same cross section LW. The third internal electrode layer 16c is provided at or substantially at the center in the width direction W, and is spaced in the width direction between the third internal electrode layer 16c, and the first internal electrode layer 16a and the second internal electrode layer 16b. The third internal electrode layer 16c is not connected to either the first external electrode 20a or the second external electrode 20b.

The number of third internal electrode layers 16c, which are not connected to the external electrode 20 and are provided between the first internal electrode layer 16a and the second internal electrode layer 16b in the width direction, is not limited to one, and a plurality of third internal electrode layers may be provided between 1 and 50, for example.

In the multilayer ceramic capacitor 10 according to the fourth preferred embodiment, the plurality of internal electrode layers 16 include at least one third internal electrode layer 16c that is provided between the first internal electrode layer 16a and the second internal electrode layer 16b in the width direction W, provided in parallel or substantially in parallel in the same or substantially the same plane as the first internal electrode layer 16a and the second internal electrode layer 16b, and is not connected with either the first external electrode 20a or the second external electrode 20b.

With such a configuration, a plurality of capacitor elements can be connected in series via the third internal electrode layer 16c, such that the capacitance of the multilayer ceramic capacitor 10 according to the fourth preferred embodiment can be reduced. Therefore, in the multilayer ceramic capacitor 10 according to the fourth preferred embodiment, the capacitance is further reduced, and the multilayer ceramic capacitor 10 can further handle high-frequency circuit signals required for low-capacitance capacitors.

Hereinafter, examples of dimensions of the multilayer ceramic capacitor 10 according to the preferred embodiments will be presented. However, these dimensions are not limited thereto. The overall schematic dimensions of the multilayer ceramic capacitor 10, although not limited to these, for example, are about 0.3 mm or more and about 0.6 mm or less in the width direction W, about 0.6 mm or more and about 1 mm or less in the length direction L, and about 0.2 mm or more and about 0.9 mm or less in the lamination direction T.

Table 1 shows more specific dimensions of Samples 1 to 12. In Table 1, the "capacitor dimension" refers to the outer dimension of the multilayer ceramic capacitor including the external electrode 20, the "multilayer body dimension" refers to the outer dimension of the multilayer body 11 except for the external electrode 20. With regard to the thickness of the external electrode, the "lateral surface" refers to the thickness of the lateral surface covering portion 21, the "end surface" refers to the thickness of the end surface covering portion 22, the "DL" refers to the distance in the length direction L between the end surface 14 and the internal electrode layer 16, and the "length of the internal electrode layer" refers to the dimension in the length direction L of the internal electrode layer 16. The dielectric ceramic layer 15 of Samples 1 to 12 is made of $CaZrO_3$ (calcium zirconate). The dimensional tolerance is about ±10%.

TABLE 1

| Sample No. | Capacitor Dimension (μm) | | | Multilayer Body Dimension (μm) | | | Thickness of External Electrode (μm) | | DL (μm) | Length of Internal Electrode Layer (μm) |
|---|---|---|---|---|---|---|---|---|---|---|
| | W | L | T | W | L | T | Lateral Surface | End Surface | | |
| 1 | 330 | 630 | 220 | 290 | 610 | 200 | 20 | 10 | 40 | 530 |
| 2 | 330 | 630 | 220 | 290 | 610 | 200 | 20 | 10 | 150 | 310 |
| 3 | 430 | 830 | 530 | 390 | 810 | 510 | 20 | 10 | 40 | 730 |
| 4 | 330 | 630 | 220 | 290 | 610 | 200 | 20 | 10 | 150 | 310 |
| 5 | 520 | 1000 | 850 | 480 | 980 | 830 | 20 | 10 | 40 | 900 |
| 6 | 520 | 1000 | 850 | 480 | 980 | 830 | 20 | 10 | 150 | 680 |
| 7 | 520 | 1000 | 165 | 480 | 980 | 145 | 20 | 10 | 40 | 900 |
| 8 | 520 | 1000 | 165 | 480 | 980 | 145 | 20 | 10 | 150 | 680 |
| 9 | 520 | 1000 | 100 | 480 | 980 | 80 | 20 | 10 | 40 | 900 |
| 10 | 520 | 1000 | 100 | 480 | 980 | 80 | 20 | 10 | 150 | 680 |
| 11 | 220 | 420 | 165 | 180 | 400 | 145 | 20 | 10 | 40 | 320 |
| 12 | 220 | 420 | 165 | 180 | 400 | 145 | 20 | 10 | 150 | 100 |

Although preferred embodiments have been described above, the present invention is not limited to the preferred embodiments described above, and modifications, improvements, and the like within a scope achieving the advantages of the present invention are included in the present invention. For example, when a capacitor having a lower capacitance is used, the internal electrode layers 16 may be omitted in the multilayer body 11, and thus, a capacitor may be configured with a structure including the pair of external electrodes 20 with the dielectric ceramic layer 15 interposed therebetween. In this case, the multilayer body 11 includes a plurality of dielectric ceramic layers 15 laminated in the lamination direction T, and the plurality of dielectric ceramic layers 15 are in direct contact with each other in the lamination direction T.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a multilayer body having a rectangular or substantially rectangular parallelepiped shape, the multilayer body including a plurality of dielectric ceramic layers laminated in a lamination direction T, the multilayer body further including a first main surface and a second main surface defining a pair of main surfaces opposed in the lamination direction T, a first lateral surface and a second lateral surface defining a pair of lateral surfaces opposed in a width direction W orthogonal or substantially orthogonal to the lamination direction T, and a first end surface and a second end surface defining a pair of end surfaces opposed in a length direction L orthogonal or substantially orthogonal to the lamination direction T and the width direction W; and
a pair of external electrodes; wherein
the pair of external electrodes include a first external electrode on the first lateral surface and a second external electrode on the second lateral surface;
the first external electrode extends from the first lateral surface to the first main surface, the second main surface, the first end surface, and the second end surface;
the second external electrode extends from the second lateral surface to the first main surface, the second main surface, the first end surface, and the second end surface;
the first lateral surface is completely covered by the first external electrode, and the second lateral surface is completely covered by the second external electrode;
the length direction L is longer than the lamination direction T or the width direction W;
a dimension of the multilayer body in the length direction L is 610 μm±10%;
a dimension of the multilayer body in the width direction W is 290 μm±10%, the width direction W being a direction in which a portion of the first external electrode covering the first lateral surface is opposed to a portion of the second external electrode covering the second lateral surface;
the multilayer body includes a plurality of internal electrode layers;
the plurality of internal electrode layers include:
a first internal electrode layer extending towards the first lateral surface and connected to the first external electrode; and
a second internal electrode layer extending towards the second lateral surface and connected to the second external electrode;
each of the first internal electrode layer and the second internal electrode layer includes Cu;
each of the dielectric ceramic layers includes a ceramic material including $(Ca_{1-x-y}, Sr_x, Ba_y)_m (Zr_{1-z-\alpha}, Ti_z, Hf_\alpha) O_3$, where x is 0 or more and about 1 or less, y is 0 or more and about 0.4 or less, m is about 1.0 or more and about 1.1 or less, z is 0 or more and about 0.2 or less, and a is 0 or more and about 0.3 or less; and
a thickness of each of the dielectric ceramic layers is about 2 μm or more and about 40 μm or less.

2. The multilayer ceramic capacitor according to claim 1, wherein the first internal electrode layer and the second internal electrode layer are in parallel or substantially in parallel within the same or substantially the same plane along the length direction L and the width direction W.

3. The multilayer ceramic capacitor according to claim 2, wherein the plurality of internal electrode layers include at least one third internal electrode layer between the first internal electrode layer and the second internal electrode layer in the width direction, provided in parallel or substantially in parallel in the same or substantially the same plane as the first internal electrode layer and the second internal electrode layer, and not connected with either of the first external electrode or the second external electrode.

4. The multilayer ceramic capacitor according to claim 1, wherein the plurality of internal electrode layers include a first internal electrode layer group including a plurality of first internal electrode layers laminated in the lamination direction T, and a second internal electrode layer group including a plurality of second internal electrode layers laminated in the lamination direction T.

5. The multilayer ceramic capacitor according to claim 1, wherein a thickness of each of the internal electrode layers is about 0.5 µm or more and about 2.5 µm or less.

6. The multilayer ceramic capacitor according to claim 1, wherein a distance DT in the lamination direction T between the main surface and the internal electrode layer closest to the main surface in the lamination direction T is about 10 µm or more and about 300 µm or less.

7. The multilayer ceramic capacitor according to claim 1, wherein a distance DL in the length direction L between the end surface and the internal electrode layers is about 5 µm or more and about 100 µm or less.

8. The multilayer ceramic capacitor according to claim 1, wherein
the multilayer body includes:
    four first ridge portions, each extending in the lamination direction T between the end surface and the lateral surface;
    four second ridge portions, each extending in the length direction L between the main surface and the lateral surface; and
    four third ridge portions, each extending in the width direction W between the main surface and the end surface;
a radius of curvature of each of the first ridge portions is about 10 µm to about 25 µm;
a radius of curvature of each of the second ridge portions is about 10 µm to about 25 µm; and
a radius of curvature of each of the third ridge portions is about 10 µm to about 25 µm.

9. The multilayer ceramic capacitor according to claim 1, wherein each of the first and second external electrodes includes a sintered metal layer and a plated layer on the sintered metal layer.

10. The multilayer ceramic capacitor according to claim 9, wherein the sintered metal layer includes Cu, Ni, Ag, Pd, Ag—Pd alloy, or Au.

11. The multilayer ceramic capacitor according to claim 9, wherein the plated layer includes a Ni-plated layer and a Sn-plated layer covering the Ni-plated layer.

12. The multilayer ceramic capacitor according to claim 1, wherein the ceramic material has a perovskite structure including Ca and Zr as a main component.

13. The multilayer ceramic capacitor according to claim 1, wherein the ceramic material includes at least one of an oxide of Mn, Mg, Dy, or Cr, an oxide of V, Sm, Eu, Gd, Tb, Ho, Er, Tm, Yb, or Y, an oxide of Co, Ni, Li, B, Na, K, or Si, or glass.

14. A multilayer ceramic capacitor comprising:
a multilayer body having a rectangular or substantially rectangular parallelepiped shape, the multilayer body including a plurality of dielectric ceramic layers laminated in a lamination direction T, the multilayer body further including a first main surface and a second main surface defining a pair of main surfaces opposed in the lamination direction T, a first lateral surface and a second lateral surface defining a pair of lateral surfaces opposed in a width direction W orthogonal or substantially orthogonal to the lamination direction T, and a first end surface and a second end surface defining a pair of end surfaces opposed in a length direction L orthogonal or substantially orthogonal to the lamination direction T and the width direction W; and
a pair of external electrodes; wherein
the pair of external electrodes include a first external electrode on the first lateral surface and a second external electrode on the second lateral surface;
the first external electrode extends from the first lateral surface to the first main surface, the second main surface, the first end surface, and the second end surface;
the second external electrode extends from the second lateral surface to the first main surface, the second main surface, the first end surface, and the second end surface;
the first lateral surface is completely covered by the first external electrode, and the second lateral surface is completely covered by the second external electrode;
the length direction L is longer than the lamination direction T or the width direction W;
a dimension of the multilayer body in the length direction L is 980 µm±10%;
a dimension of the multilayer body in the width direction W is 480 µm±10%, the width direction W being a direction in which a portion of the first external electrode covering the first lateral surface is opposed to a portion of the second external electrode covering the second lateral surface;
the multilayer body includes a plurality of internal electrode layers;
the plurality of internal electrode layers include:
    a first internal electrode layer extending towards the first lateral surface and connected to the first external electrode; and
    a second internal electrode layer extending towards the second lateral surface and connected to the second external electrode;
each of the first internal electrode layer and the second internal electrode layer includes Cu;
each of the dielectric ceramic layers includes a ceramic material including $(Ca_{1-x-y}, Sr_x, Ba_y)_m (Zr_{1-z-\alpha}, Ti_z, Hf_\alpha) O_3$, where x is 0 or more and about 1 or less, y is 0 or more and about 0.4 or less, m is about 1.0 or more and about 1.1 or less, z is 0 or more and about 0.2 or less, and a is 0 or more and about 0.3 or less; and
a thickness of each of the dielectric ceramic layers is about 2 µm or more and about 40 µm or less.

15. A multilayer ceramic capacitor comprising:
a multilayer body having a rectangular or substantially rectangular parallelepiped shape, the multilayer body including a plurality of dielectric ceramic layers laminated in a lamination direction T, the multilayer body further including a first main surface and a second main surface defining a pair of main surfaces opposed in the lamination direction T, a first lateral surface and a second lateral surface defining a pair of lateral surfaces opposed in a width direction W orthogonal or substantially orthogonal to the lamination direction T, and a first end surface and a second end surface defining a pair of end surfaces opposed in a length direction L orthogonal or substantially orthogonal to the lamination direction T and the width direction W; and a pair of external electrodes; wherein the pair of external electrodes include a first external electrode on the first lateral surface and a second external electrode on the second lateral surface;

the first external electrode extends from the first lateral surface to the first main surface, the second main surface, the first end surface, and the second end surface;

the second external electrode extends from the second lateral surface to the first main surface, the second main surface, the first end surface, and the second end surface;

the first lateral surface is completely covered by the first external electrode, and the second lateral surface is completely covered by the second external electrode;

the length direction L is longer than the lamination direction T or the width direction W;

a dimension of the multilayer body in the length direction L is 400 μm±10%;

a dimension of the multilayer body in the width direction W is 180 μm±10%, the width direction W being a direction in which a portion of the first external electrode covering the first lateral surface is opposed to a portion of the second external electrode covering the second lateral surface;

the multilayer body includes a plurality of internal electrode layers;

the plurality of internal electrode layers include:
  a first internal electrode layer extending towards the first lateral surface and connected to the first external electrode; and
  a second internal electrode layer extending towards the second lateral surface and connected to the second external electrode;

each of the first internal electrode layer and the second internal electrode layer includes Cu;

a thickness of each of the internal electrode layers is about 0.5 μm or more and about 2.5 μm or less;

each of the dielectric ceramic layers includes a ceramic material including $(Ca_{1-x-y}, Sr_x, Ba_y)_m (Zr_{1-z-\alpha}, Ti_z, Hf_\alpha) O_3$, where x is 0 or more and about 1 or less, y is 0 or more and about 0.4 or less, m is about 1.0 or more and about 1.1 or less, z is 0 or more and about 0.2 or less, and a is 0 or more and about 0.3 or less; and a thickness of each of the dielectric ceramic layers is about 2 μm or more and about 40 μm or less.

\* \* \* \* \*